United States Patent
Murphy

(10) Patent No.: US 6,651,400 B1
(45) Date of Patent: Nov. 25, 2003

(54) FOAM CORE PANEL CONNECTOR

(75) Inventor: Terry J. Murphy, Scappoose, OR (US)

(73) Assignee: Rapid Displays, Inc., Chicago, IL (US)

( * ) Notice: Subject to any disclaimer, the term of this patent is extended or adjusted under 35 U.S.C. 154(b) by 0 days.

(21) Appl. No.: 09/982,434

(22) Filed: Oct. 18, 2001

(51) Int. Cl.[7] ............................................. E04B 2/00
(52) U.S. Cl. ........................ 52/586.2; 52/794.1; 108/42; 108/152
(58) Field of Search ................. 52/582.1, 586.1, 52/586.2, 585.1, 794.1, DIG. 6; 108/42, 152, 108–110, 184, 185; 403/294, 292, 251, 298; 411/451.3, 451.1, 456, 457, 508, 509; 24/563, 570, 457, 458

(56) References Cited

U.S. PATENT DOCUMENTS

| | | | |
|---|---|---|---|
| 434,436 A | * 8/1890 | Eckert | 411/451.3 |
| 2,228,052 A | * 1/1941 | Gardner | 52/396.03 |
| 2,599,994 A | 6/1952 | Hirsch | |
| 3,160,249 A | * 12/1964 | Pavlecka | 52/586.2 |
| 3,333,555 A | * 8/1967 | Kapnek | 108/152 |
| 3,363,383 A | 1/1968 | La Barge | |
| 3,563,582 A | * 2/1971 | Shroyer | 287/20.92 |
| 3,760,547 A | 9/1973 | Brenneman | |
| 3,766,675 A | 10/1973 | Leigh | |
| 3,883,258 A | 5/1975 | Hewson | |
| 4,257,207 A | 3/1981 | Davis | |
| 4,365,454 A | 12/1982 | Davis | |
| 4,454,699 A | * 6/1984 | Strobl | 52/585 |
| 4,599,841 A | 7/1986 | Haid | |
| 4,608,103 A | 8/1986 | Aldrich | |
| 4,687,534 A | 8/1987 | Alford et al. | |
| 4,711,046 A | 12/1987 | Herrgord | |
| 4,785,565 A | 11/1988 | Kuffner | |
| 4,850,913 A | 7/1989 | Szabad, Jr. | |
| 5,661,936 A | 9/1997 | Ellingson | |
| 5,694,730 A | * 12/1997 | Del Rincon et al. | 52/586.1 |
| 5,730,544 A | 3/1998 | Dils et al. | |
| 5,950,389 A | 9/1999 | Porter | |
| 5,992,110 A | 11/1999 | Clear | |

* cited by examiner

Primary Examiner—Carl D. Friedman
Assistant Examiner—Naoko Slack
(74) Attorney, Agent, or Firm—Piper Rudnick LLP; Jefferson Perkins

(57) ABSTRACT

The present invention discloses a connector used to join two or more panels having a foam core and having a cavity defined in a edge thereof. The connector includes a connector body having at least two attachment heads which are dimensioned to fit snugly within the corresponding cavities bounded by internal sidewalls defined in the foam core. Barbs provided on each attachment head are configured to pierce the internal sidewalls of the panels and inhibit withdrawal of the attachment head from the cavity defined in the foam core.

30 Claims, 15 Drawing Sheets

FIG. IJ
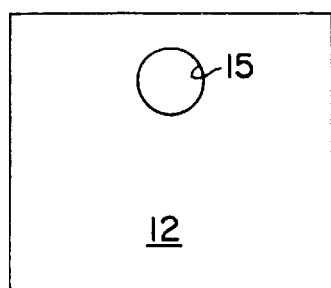
FIG. IK
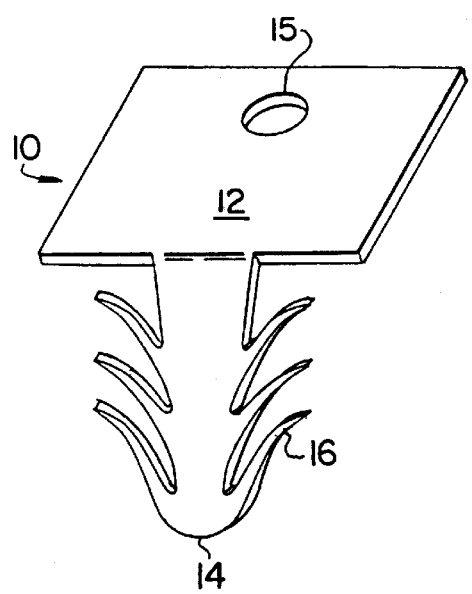
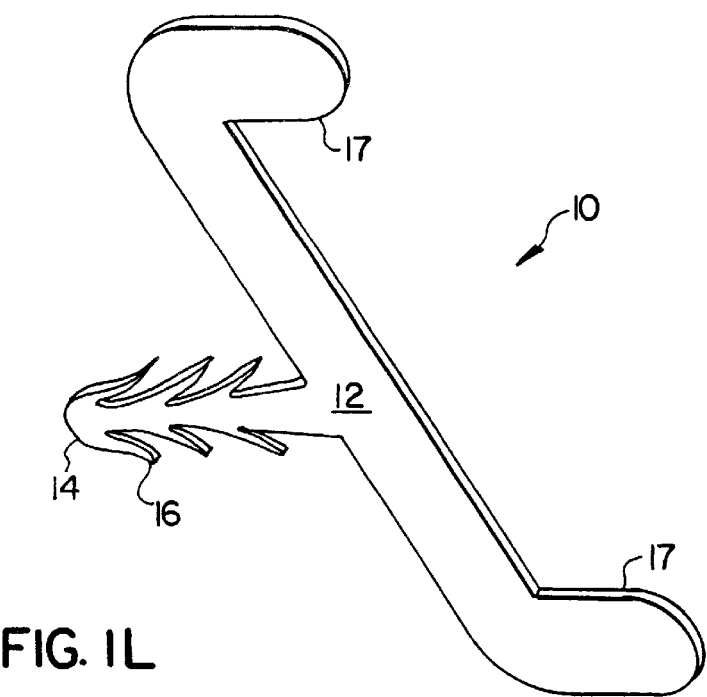
FIG. IL

FIG. 6A
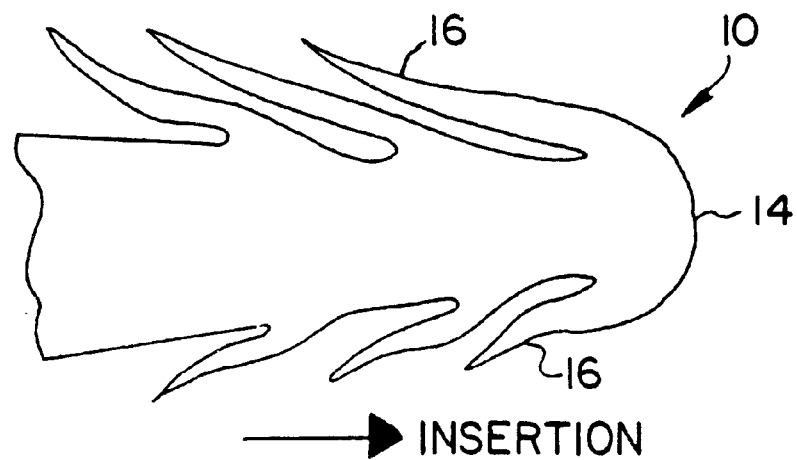
INSERTION
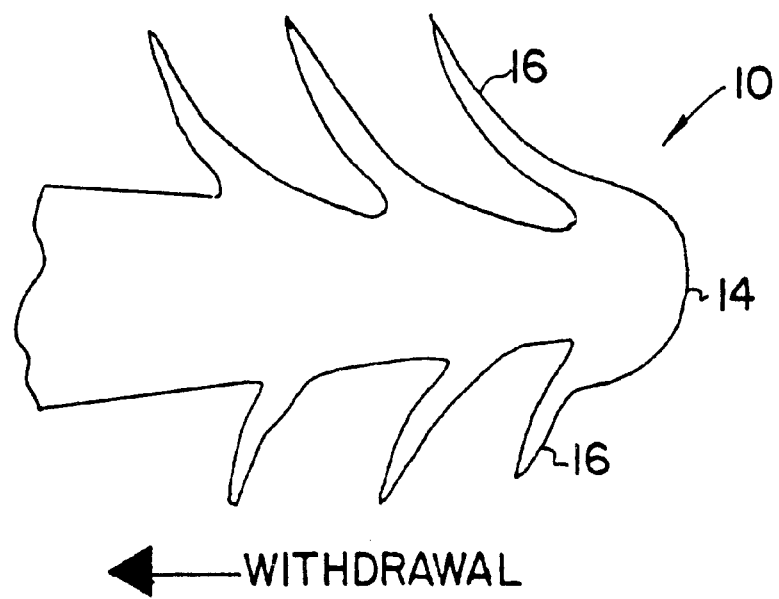
WITHDRAWAL
FIG. 6B

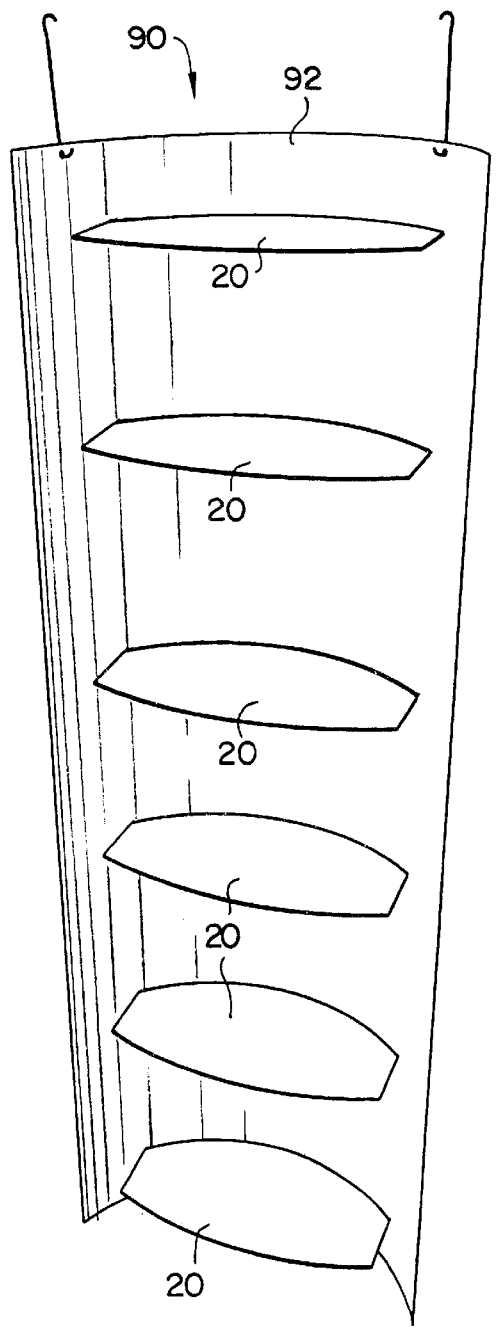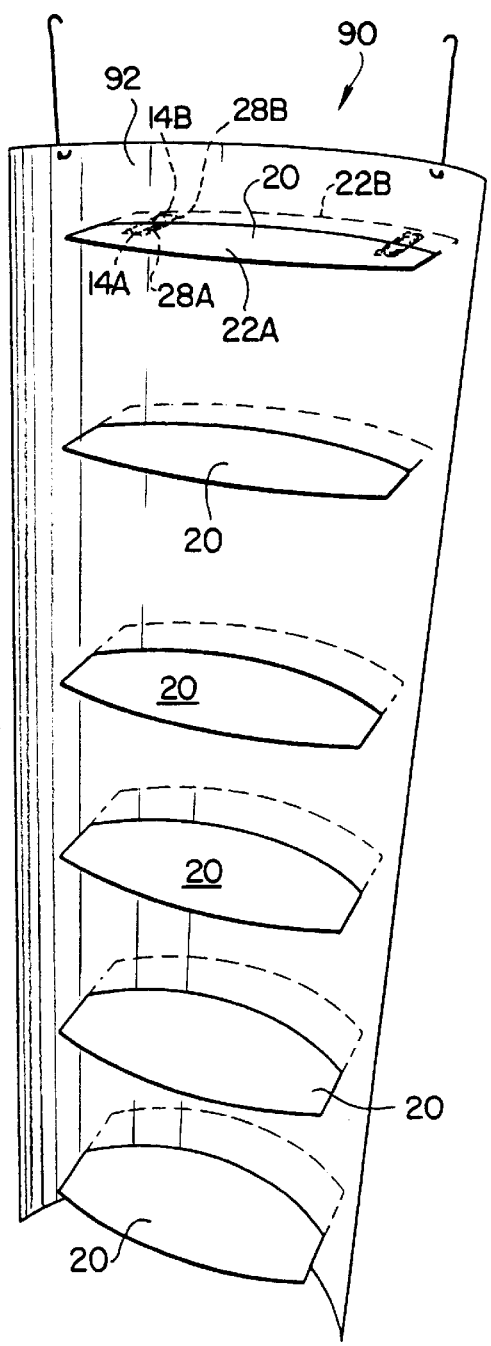

FOAM CORE PANEL CONNECTOR

FIELD OF THE INVENTION

The present invention relates to foam core panels in general, and more particularly to a method and devices used to connect the edges of two or more panels. The method and devices of the present invention are particularly useful in constructing point of purchase displays.

BACKGROUND

The use of foam core panels in the construction of point of purchase displays or the like has become increasingly popular because such panels are light, rigid, relatively inexpensive, and easy to use. Such panels typically consist of an extruded polystyrene, polyethylene or polyurethane foam core laminated on both sides with bleached white clay coated Kraft paper liners.

Foam core panels are popular in part because they are great for printing, easily accept most glues and are easy to cut. However, one long felt but unmet need relates the connection together of foam core panels and their use to construct three-dimensional displays. It is often desirable to join two or more panels edge-to-edge to form a smooth continuous surface. However, conventional methods for joining foam core panels are not sufficiently sturdy or easy to use.

One conventional method for connecting foam core panels is through the use of glue. However, the use of glue is not desirable in many applications. Moreover, the use of glue may not be practical depending on the size and weight of the panels being connected. Moreover, the use of glue requires time for the glue to set.

Another conventional method for connecting foam core panels uses screws and grommets. The use of grommets and screws is particularly suited to connecting high density boards but is not suitable in applications in which the panels must be rigidly connected to form a continuous surface. Further, conventional panel connection hardware remains visible in the end of the product. One Objective in creating multi-panel point of purchase displays is to present "clean" surfaces which are free of straps, tape, rivets and like visually distracting artifacts of connection.

Accordingly, what is needed is an inexpensive and easy to use connector for rigidly connecting foam core panels, without the use of adhesives, screws, or other visible hardware.

SUMMARY OF THE INVENTION

The present invention provides a connector used to join two or more panels, each having a foam core and having a cavity, bounded by internal sidewalls, defined in an edge thereof. The connector includes a body having at least two attachment heads dimensioned to fit snugly within corresponding cavities defined in edges of the foam core panel. Plural barbs provided on each attachment head are configured to enter respective cavities, pierce the internal sidewalls and inhibit withdrawal of the attachment head from the cavity.

According to one aspect of the invention, the foam core has a density $D_{foam}$ and the internal sidewalls bounding the cavity have a density $D_{skin}$ wherein $D_{foam} < D_{skin}$.

According to one embodiment of the present invention the barbs are configured to facilitate easy insertion into the cavity and subsequently resist withdrawal of the barbs from the foam core.

According to another embodiment, the body of the connector includes a spacer portion which inhibits insertion of the body into the cavity beyond a predetermined depth such that the spacer portion provides predetermined spacing between adjacent panels.

The connector of the present invention may be used to construct a point of purchase display including a support member having at least one hole defined therethrough and at least two foam core panels. Each panel has a foam core having a cavity, bounded by internal sidewalls, formed to extend inwardly from an edge of the panel. A connector having a body portion is provided having at least two attachment heads dimensioned to fit snugly within corresponding cavities defined in the foam core panels. Plural barbs provided on each attachment head are configured to pierce the internal sidewalls and inhibit withdrawal of the attachment head from the cavity. In operation, the connector is inserted into the hole defined in the support member and connects foam core panels on opposite sides of the support member.

The support member may optionally be formed of a flexible transparent or translucent material such as plastic, and may optionally be curved with the curved member being contoured to conform to the edges of the foam core panels and provide additional rigidity to the member.

The connector of the present invention may further be used to construct a point of purchase display including a plurality of panels, each having a foam core having a first cavity defined in a vertical edge portion thereof and a second cavity defined in a horizontal side edge portion thereof. Each cavity being bounded by internal sidewalls. A plurality of connectors are provided, each having a body portion and at least two attachment heads dimensioned to fit snugly within corresponding ones of the cavities. Barbs provided on each attachment head are configured to pierce the internal sidewalls and inhibit withdrawal of the attachment head from the cavity. The plurality of panels are connected in a series of rows and columns with connectors connecting adjacent ones of the plurality of panels.

These and other aspects of the invention will be better explained in the detailed description of the preferred embodiments.

BRIEF DESCRIPTION OF THE DRAWINGS

FIGS. 1A–1L show several different configurations of a connector according to the present invention;

FIGS. 6A and 6B show an enlarged view of an attachment head according to the present invention;

FIGS. 9A and 9B show a third configuration of a display constructed using a connector according to the present invention.

DETAILED DESCRIPTION OF THE PREFERRED EMBODIMENT

FIGS. 1A–1L illustrate several alternative configurations of a connector 10 according to the present invention. In its simplest form the connector 10 has a body 12 with at least one attachment head 14 and plural barbs projecting away from the attachment head 14. However, the connector 10 may have any number of attachment heads 14 at varying angles relative to the connector body 12.

Figure 1A:
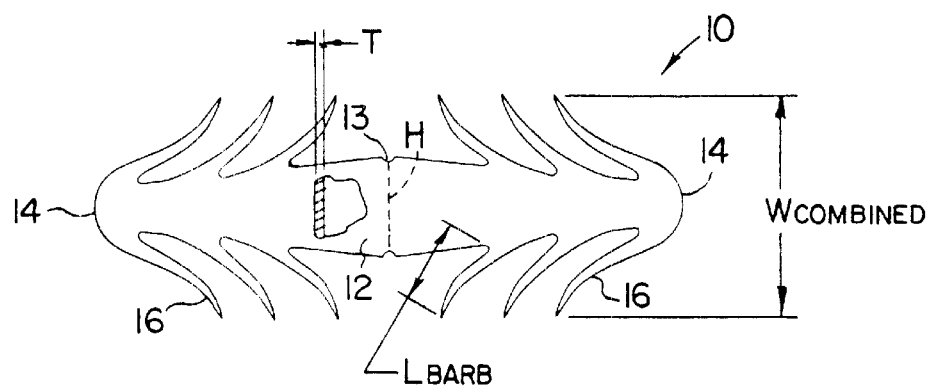

In the configuration shown in FIG. 1A the connector 10 has two attachment heads 14, each head 14 having plural barbs 16. Indentations 13 may be used to form a hinge line H where the connected panels are not to be coplanar.

Figure 1B:
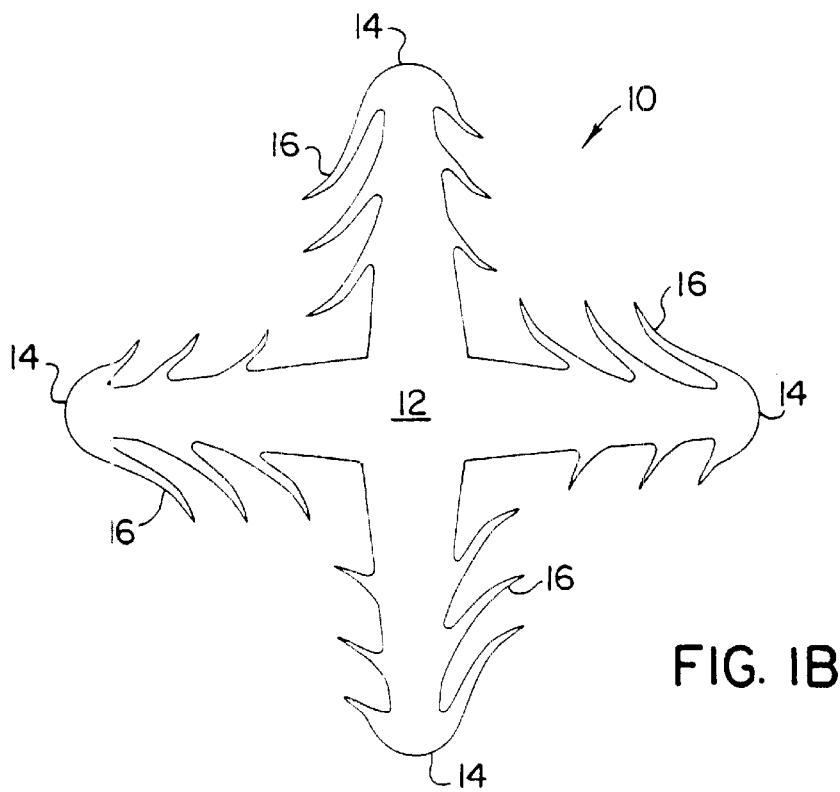

In the configuration shown in FIG. 1B the connector 10 has two attachment heads on a first side of the connector body 12, and two additional attachment heads on a second side of the connector body 12.

Figure 1C:
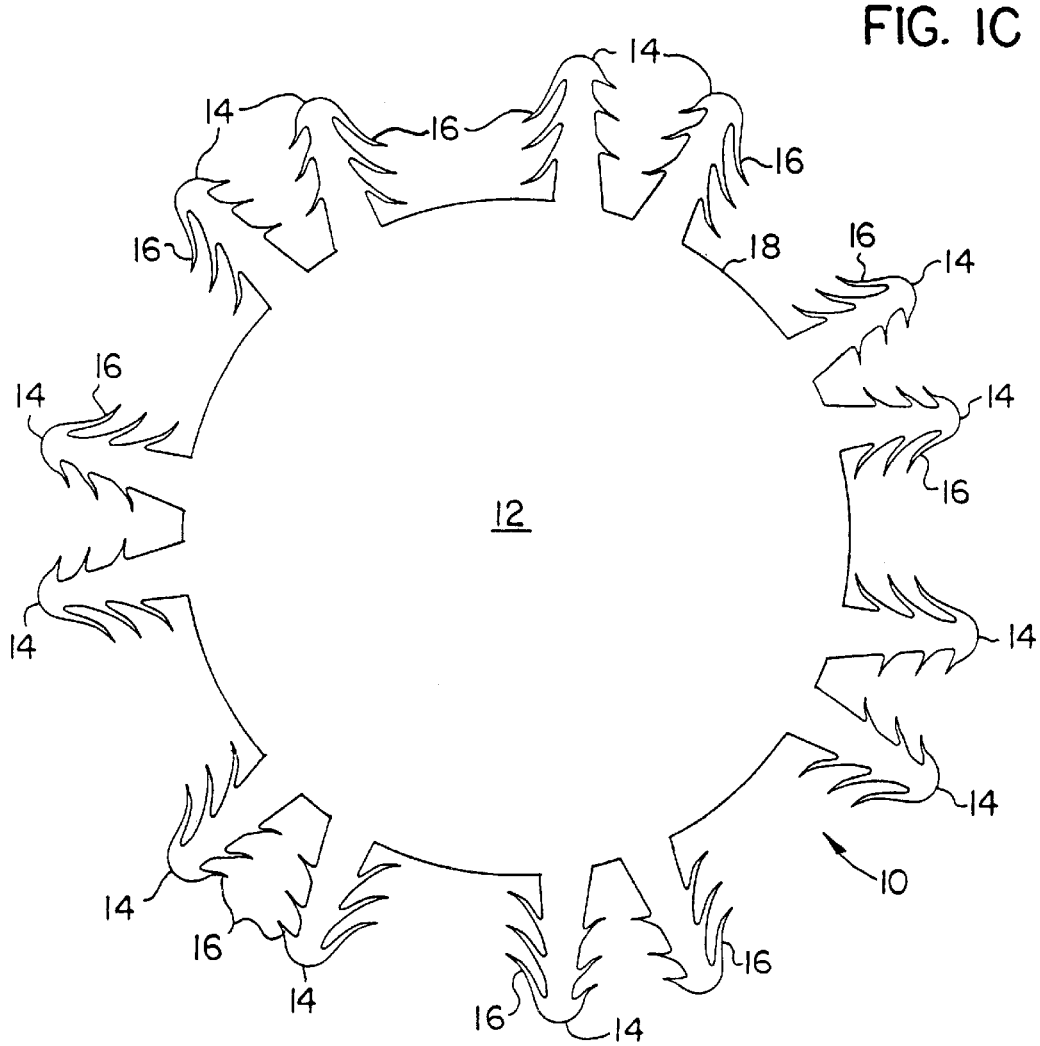

In the configuration shown in FIG. 1C the connector body 12 is generally circular and includes plural attachment heads 14 radially projecting from a central disk.

In the configuration shown in FIG. 1D the connector body 12 includes a spacer portion 18 which will be described herein below.

Figure 1D:
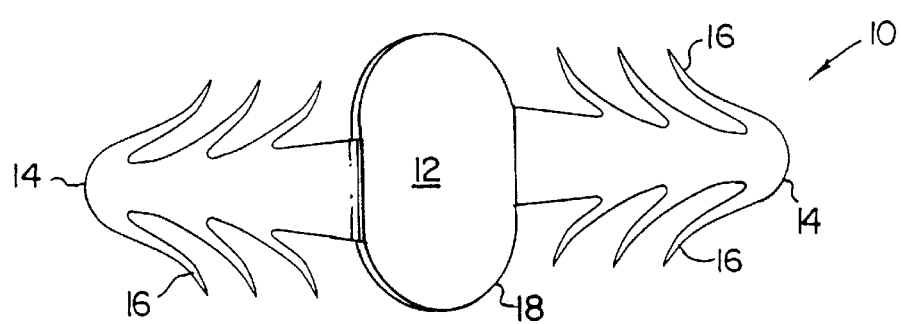
Figure 1E:
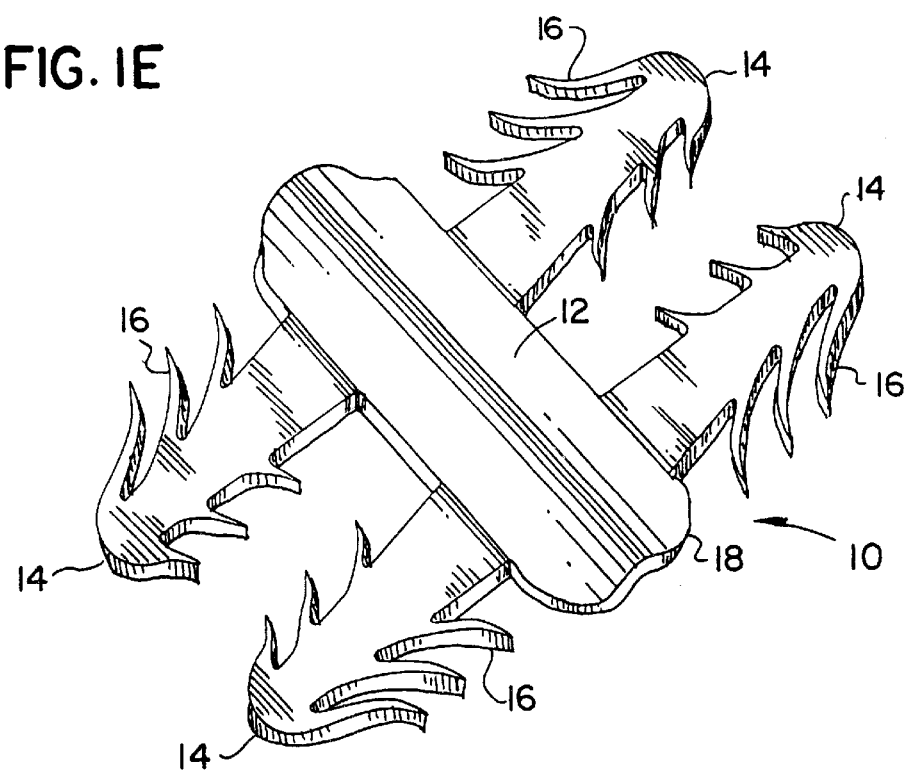

In the configuration shown in FIG. 1E the connector body 12 is stepped such that two attachment heads 14A are on a different plane than another opposed attachment head 14B.

Figure 1F:
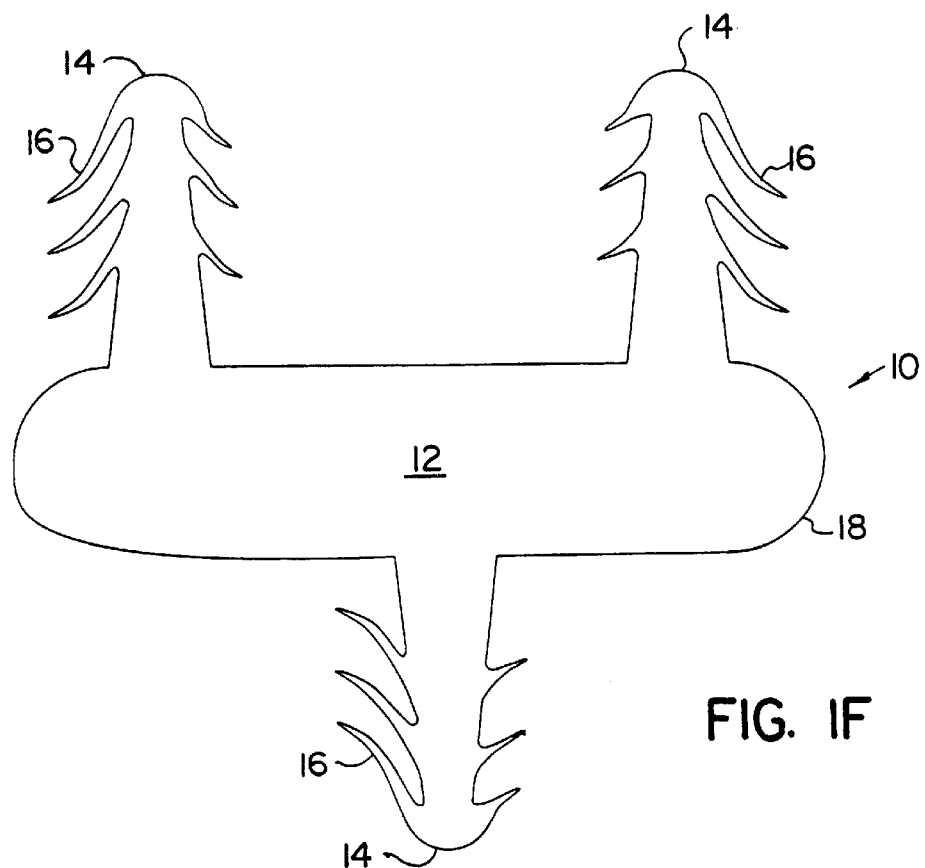
Figure 1G:
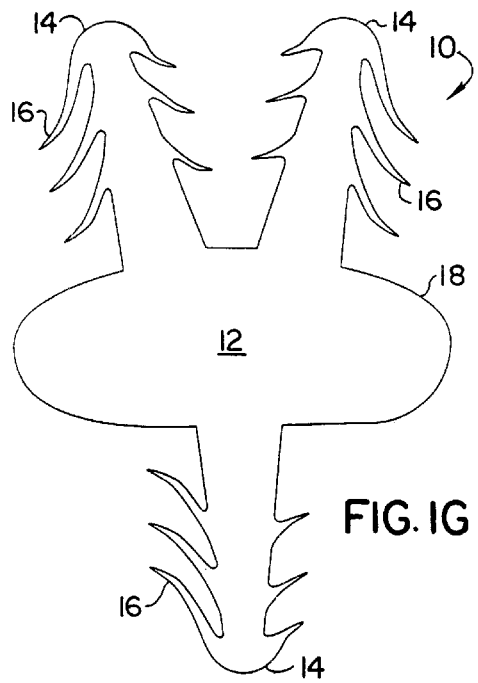

In the configurations shown in FIGS. 1F and 1G the connector 10 includes three attachment heads 14, two on one side of the connector body 12 and one on the other side. In FIG. 1F, the attachment heads on one side are parallel to each other, while in FIG. 1G the attachment heads 14 on one side of the spacer 18 project at an angle to each other.

Figure 1H:
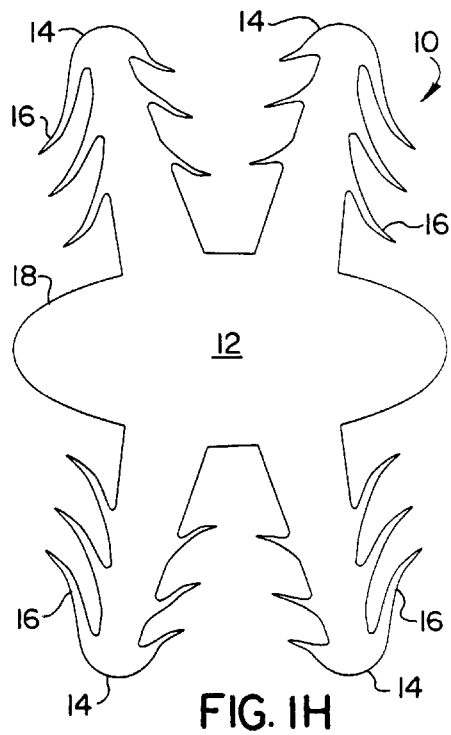

In the configuration shown in FIG. 1H the connector 10 includes four attachment heads 14, two on each side of the connector body 12.

Figure 1I:
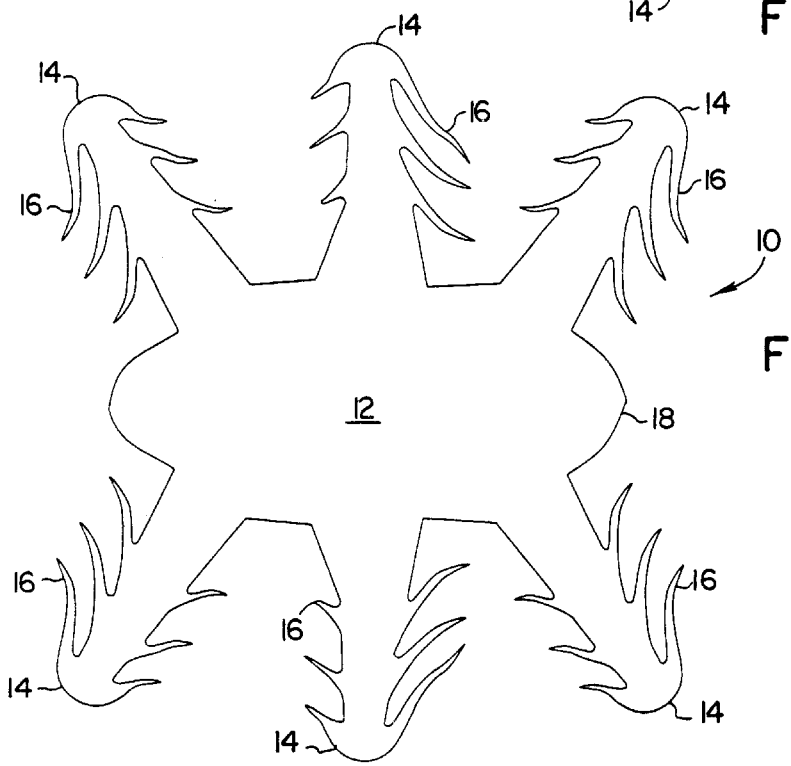

In the configuration shown in FIG. 1I the connector 10 includes six attachment heads 14, three on each side of the connector body 12 and projecting outwardly at different angles.

In the configuration shown in FIGS. 1J–L the connector 10 has a single attachment head 14. More particularly, the connector 10 in FIGS. 1J and 1K includes an attachment head 14 at one end and a mounting hole 15 at another end. The mounting hole 15 may be connected, for example, to a support (not shown) such as a hook, or a string or wire suspended from a ceiling. The body 12 in FIG. 1J is generally in the same plane with the attachment head 14, whereas in FIG. 1K the connector body 12 is in a different plane than the attachment head 14.

The connector 10 shown in FIG. 1L includes an attachment head 14 at one end and a support portion 17 at another end. The support portion 17 may be used, for example, to support a display item (shown in dashed lines in FIG. 10) such as a shoe, a shelf or the like.

Referring to FIG. 1A, the attachment heads 14 generally have a width $W_{head}$ and a thickness $T_{head}$ which is varied depending on the density and thickness of the foam core and the required fastening force and the resiliency of the material from which the barbs are made. The barbs 16 generally have length $L_{barb}$ which is also varied depending on the density and thickness of the foam core and the required fastening force. The width $W_{head}$ is generally much greater than the thickness $T_{head}$ ($W_{head} \gg T_{head}$), such that the connector 10 may be used with relatively thin panels 20, be made of a material such as plastic yet possess the strength required to perform its fastening function.

The width W may be dictated by the strength of the material used to form the connector. Moreover, a wide connector 10 acts against torsion of the panels around the connector axis, and thus is useful in constructing a more rigid connection.

The barbs 16 are preferably resilient or springy, and should be elongated so that they will yield to a cantilever force placed on them more easily than to a column force applied in alignment with their lengths.

According to a preferred embodiment, the head 14 has a thickness $T_{head}$ is selected in relation to the thickness of the foam core $T_{foam}$ into which of the head is being inserted. According to a preferred embodiment, the ratio of $T_{head}$ to $T_{foam}$ is generally 1:3. In other words, the thickness of the head 14 is generally ⅓ of the thickness of the foam core 22.

The connector 10 is suitable for use in conjunction with a wide variety of low-density foam products, and provides between 5.5 and 12 pounds of fastening force depending on the density of the foam core, the size and number of attachments heads, and the size and number of barbs 16.

The connector 10 may be formed from any of a number of different materials such as plastic, metal, or the like. According to a presently preferred embodiment, the connector 10 is integrally formed from injection molded plastic.

Preferably, the attachment heads 14, connector body 12, and barbs 16 are integrally formed as a single piece. However, the attachment heads 14 and barbs may be formed separately from the connector body 12, such that the attachment head is later joined with the connector body by thermo-bonding or the like.

The dimensions of the connector 10 may be adjusted depending on the size and thickness of panels to be connected, and the amount of fastening force required. According to a presently preferred embodiment, the head 14 has a thickness generally falling in the range $\frac{1}{16}$ inch $\leq T_{head} \leq \frac{3}{16}$ which generally corresponds to a foam core thickness in the range $\frac{3}{16}$ inch $\leq T_{foam} \leq \frac{1}{2}$ inch. However, it should be appreciated that the invention is not limited to any particular dimensions.

Figure 2A:
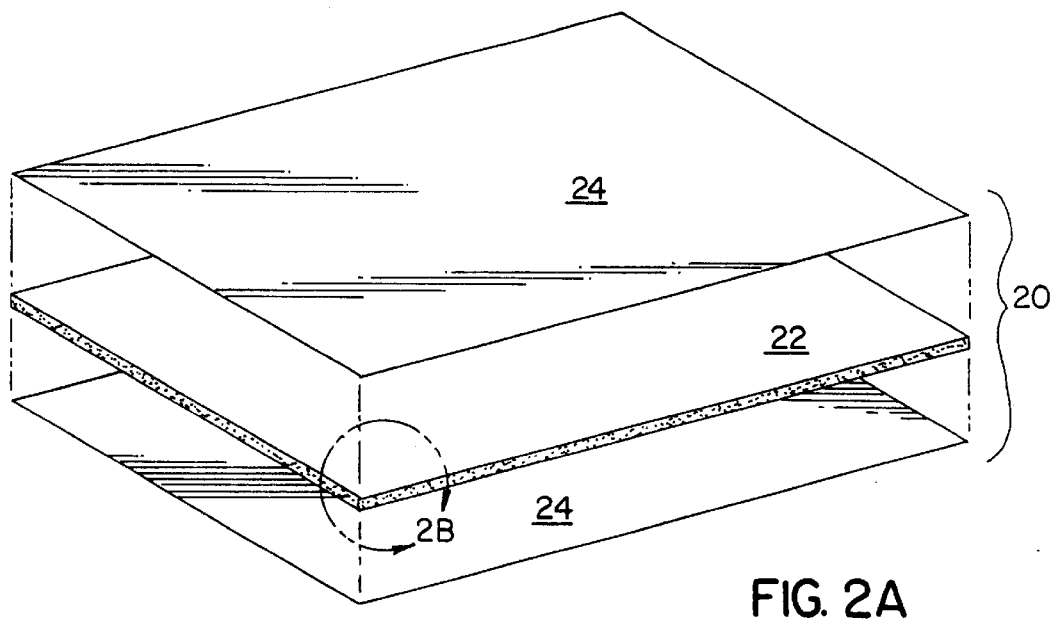
FIG. 2A shows an exploded view of a conventional foam core panel.
Figure 2B:
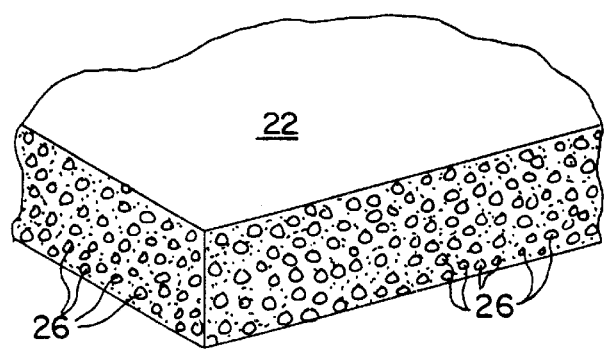
FIG. 2B shows an enlarged sectional detail view of the foam core panel of FIG. 2A.

FIG. 2A shows an exploded view of a conventional foam core panel 20 which includes a foam core 22 formed of a thermoplastic, foamed polymer such as polystyrene, polyethylene or polyurethane laminated on both sides with bleached white clay coated Kraft paper liners 24. FIG. 2B shows an enlarged sectional view showing that the foam core 22 is composed of plural foam cells 26.

Use of the connector 10 of the present invention is not limited to any particular composition of foam core panel, and will work with commercially available foam core boards. However, the density of the foam core must be sufficiently low to allow the barbs to pierce a heat-collapsed skin made from the foam core. Preferably, the density of the foam core is between 0.02 and 0.15 grams per cubic centimeter.

Figure 3:
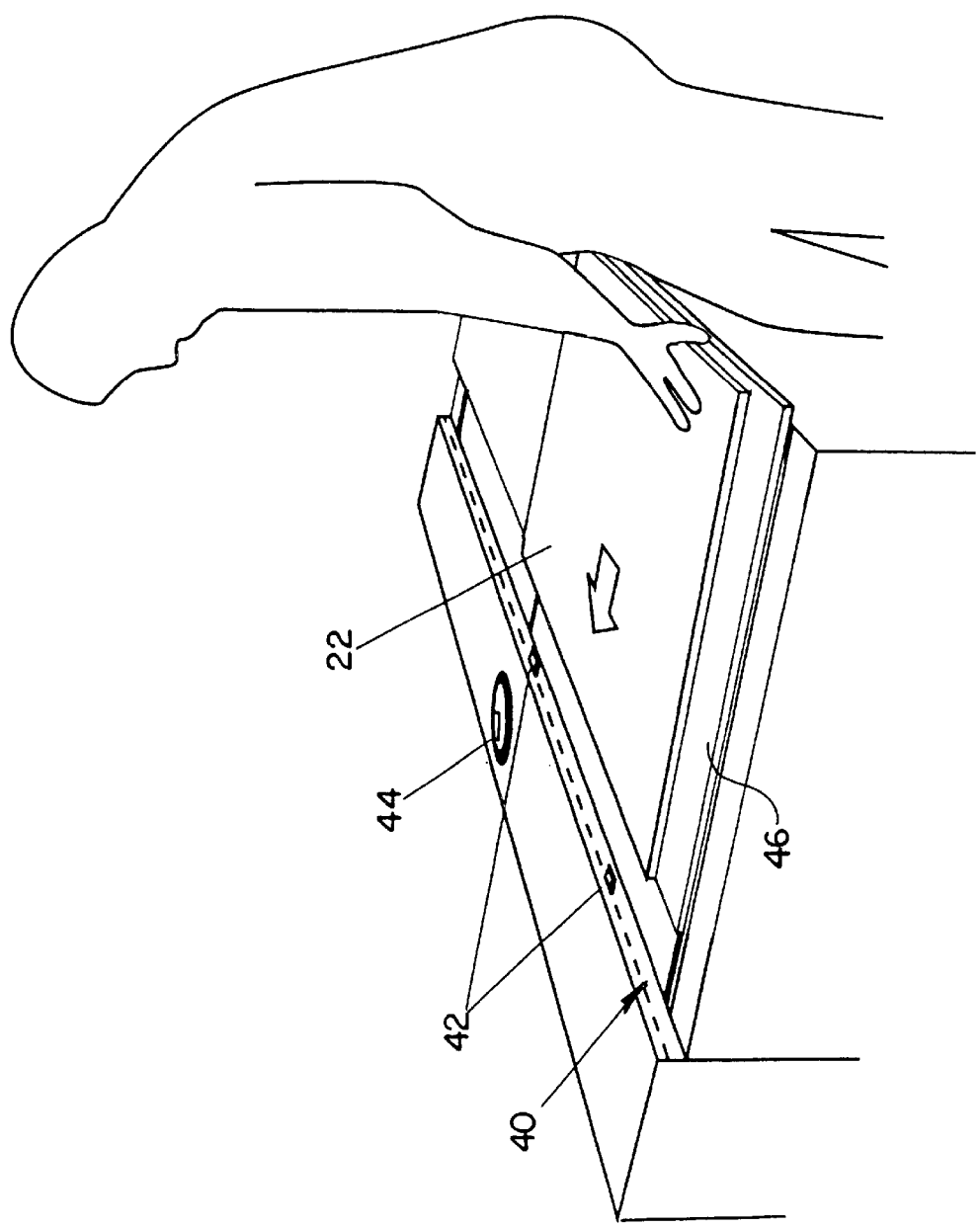
FIG. 3 shows a cavity-forming tool according to the present invention.
Figure 4A:
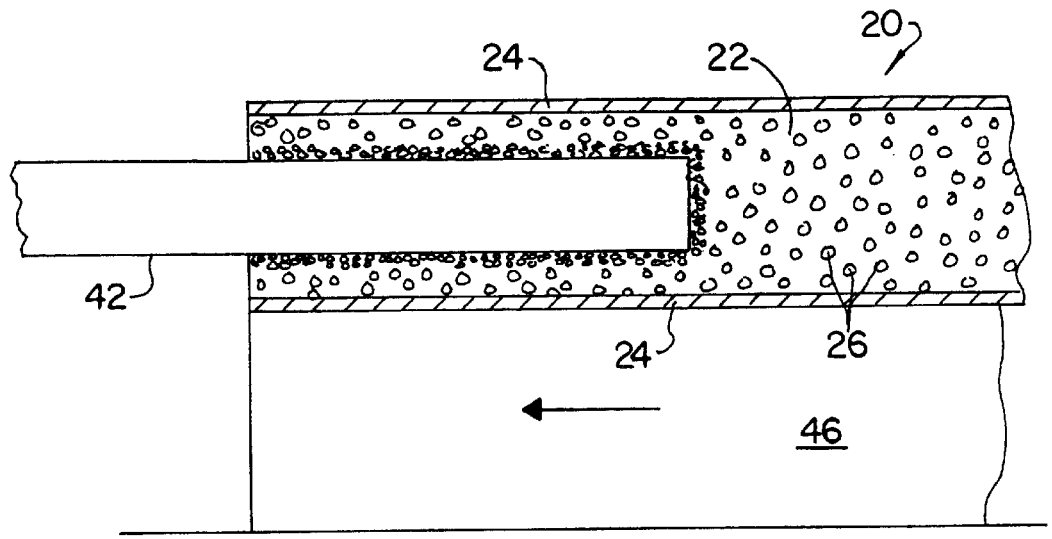
FIGS. 4A and 4B show how the cavity-forming tool of FIGS. 3A and 3B is used to form a cavity in the foam core.
Figure 4B:
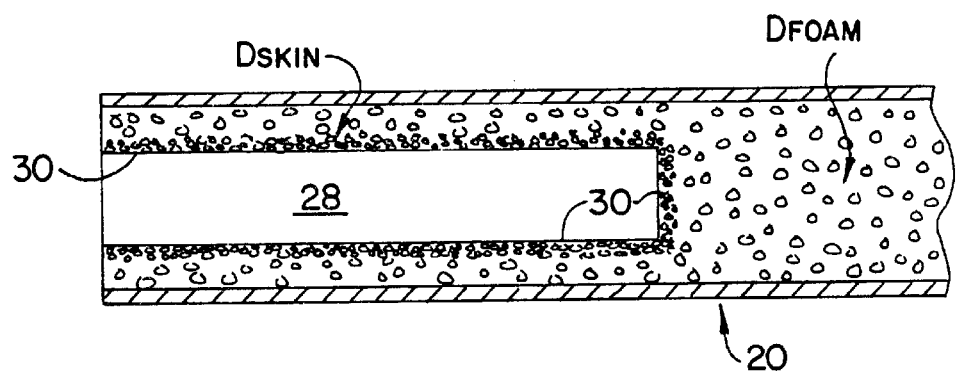

FIG. 3 shows a cavity-forming tool 40 according to the present invention, and FIGS. 4A and 4B show how the tool 40 is used to form a cavity 28 in the foam core 22. As best r seen in FIG. 4B heat generated by the heating element 42 of the tool 40 causes the foam cells 26 to collapse upon insertion of the element 42 into the foam core layer 22, creating a cavity 28. More particularly, the foam has a melting point of approximately 375 to 425 degrees Fahrenheit. As the cells collapse due to the heat they form a skin 30 of collapsed material which is denser than the foamed material. Notably, the foamed material has a density between 0.02 and 0.15 grams per cubic centimeter, whereas the collapsed or unfoamed material has a density between 0.9 and 1.25 grams per cubic centimeter. Specifically, unfoamed polystyrene has a density of approximately 1.04 to 1.09 grams per cubic centimeter, unfoamed polyethylene has a density of approximately 0.91 to 0.965 grams per cubic centimeter, and unfoamed polyurethane has a density of approximately 1.05 to 1.25 grams per cubic centimeter.

The cavity 28 is dimensioned to snugly accommodate one of the attachment heads 14. Care must be exercised to ensure that the cavity 28 is slightly narrower than the combined width $W_{combined}$ of the attachment head 14 and barb 16 connector, and is of generally the same thickness as the thickness T of the attachment head 14 of the connector 10. See FIG. 5B.

Figure 5A:
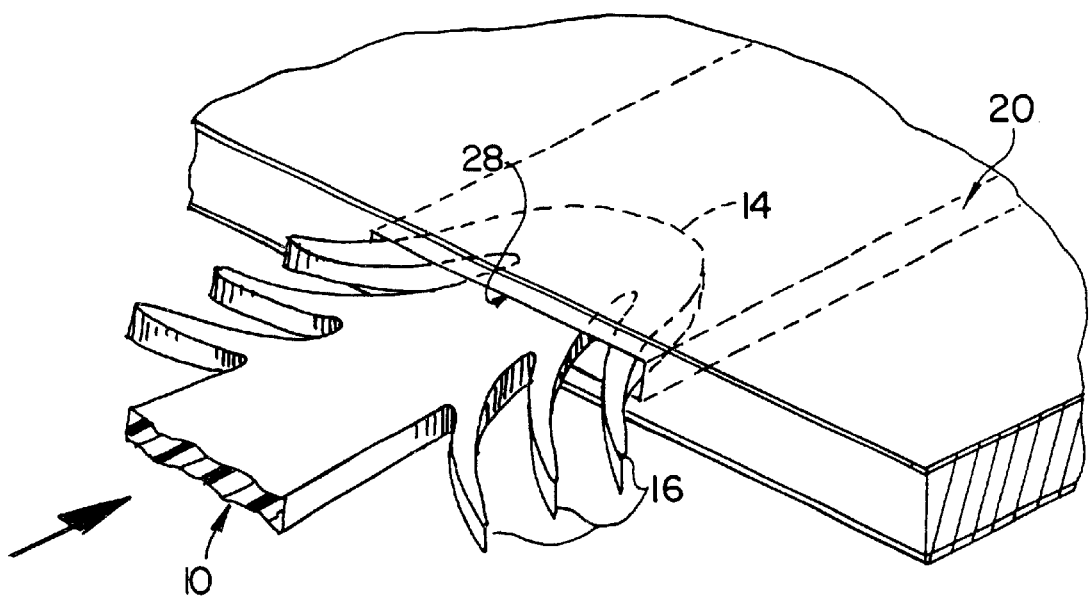
FIGS. 5A and 5B shows an enlarged view of a connector attachment head piercing the foam core of a panel according to the present invention.

The attachment head 14 is forcedly inserted into the cavity 28 such that the barbs 16 pierce the denser skin 30 and are retained therein. See FIGS. 5A and 5B.

Figure 5B:
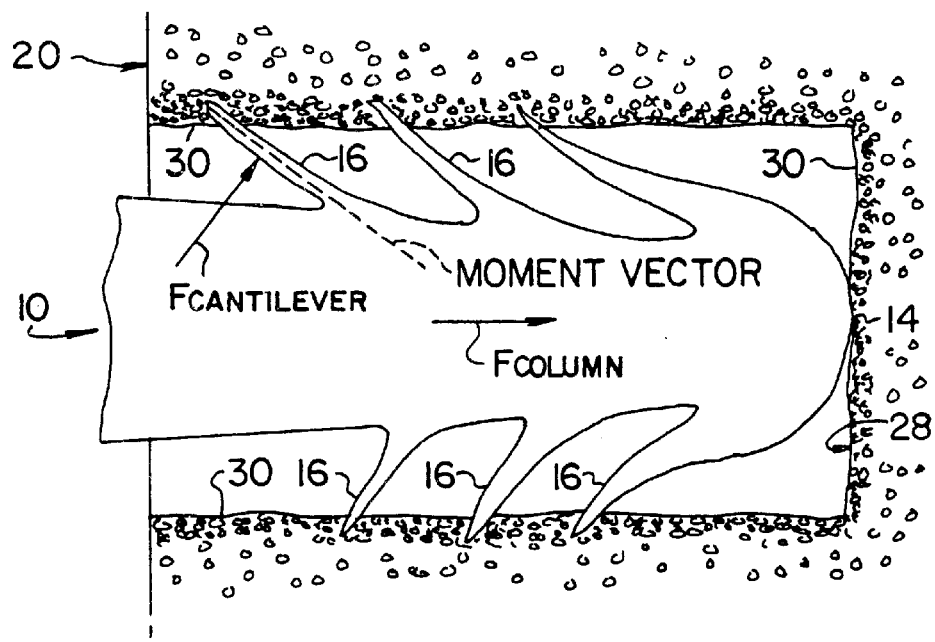
Figure 5C:
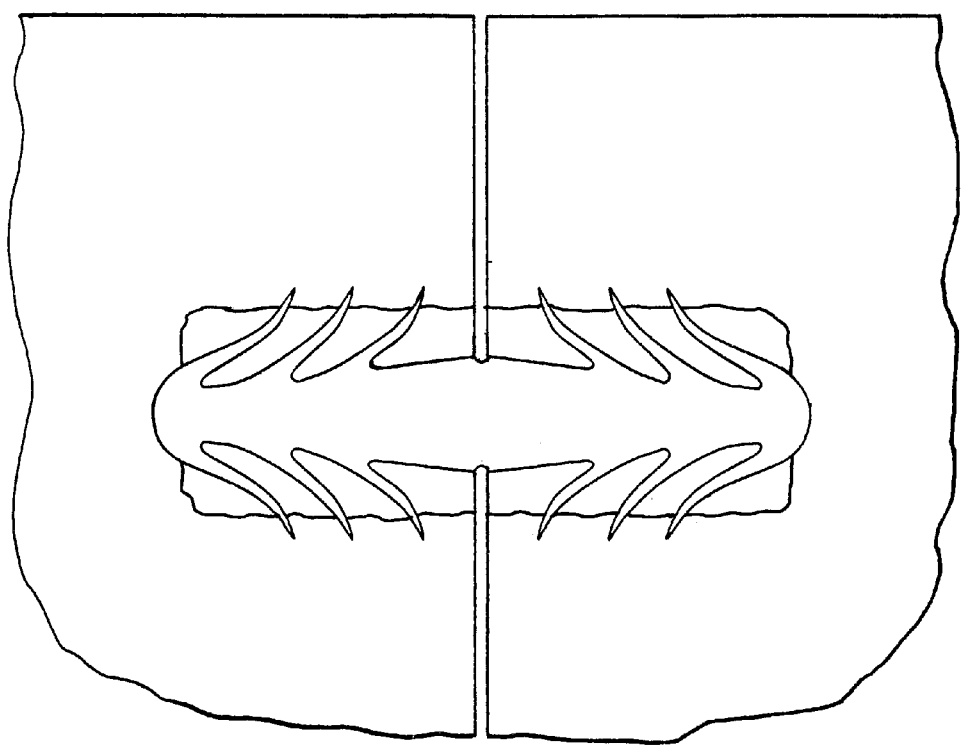
FIG. 5C is a sectional view showing the connector of the present invention connecting two foam core panels;.

FIG. 5C is a sectional view showing the connector 10 inserted into corresponding cavities 28 of the foam core panels 20, and providing a substantially smooth planar connection therebetween.

According to an alternative embodiment, the cavity 28 may be formed by mechanically removing the foam using, for example, a knife or the like rather than by the heating tool 40. However, the use of heating tool 40 is preferred because it creates the denser skin 30 which is believed to more effectively retain the barbs 16 of the connector 10.

As shown in FIGS. 1D and 1E, the connector body 12 may be provided with a spacer portion 18 which provides spacing between adjacent panels 20. The spacer portion 18 is configured to prevent more than a predetermined length of the connector 10 from being inserted into the cavity 28. When the connector 10 is formed of a clear plastic, an effect may be achieved whereby a panel looks as if it is suspended in mid-air without any support.

In the embodiment depicted in FIG. 1D, the spacer portion 18 has a width $W_{spacer}$ which is larger than the combined width $W_{combined}$ of the attachment head 14 and the barb 16. In the embodiment depicted in FIG. 1E, the spacer portion 18 is stepped such that attachment head 14A is in a different plane from attachment head 14B. Moreover, the spacer portion 18 may be mutually perpendicular to both attachment heads 14A and 14B.

According to one aspect of the present invention, the connector 10 is configured such that when a cantilever loading is imposed on the barbs 16 they are generally more resilient and yielding in an insertion direction (FIG. 6) than they are in a withdrawal direction.

More particularly, and referring to FIG. 5B, when an insertion force is applied to urge the connector 10 into the cavity 28, the peripheral wall of the foam core 22 contacts the barbs 16 and imposes a compressive force $F_{cantilever}$ at a significant angle to axis A of the barbs 16, urging the barbs inwardly toward the body 12. Correspondingly, when a withdrawal force is applied to withdraw the connector 10 from the cavity 28, the peripheral wall of the foam core 22 interferes with the barbs 16 and imposes a column loading force $F_{column}$ that is at an acute angle to axis A of the barbs, pulling the barbs 16 away from the body 12. Importantly, $F_{column}$ is significantly greater than $F_{cantilever}$ such that a greater force is required to withdraw the connector from the cavity 28 than the force required to insert the connector into the cavity 28. Stated in another way, the elongate, resilient barbs 16 are more yielding to forces at a substantial angle to the direction of the length of the connector body than they are to an extraction force in substantial alignment with that direction. The barbs 16 elastically deform toward the center of the attachment head 14 when the attachment head is inserted into the cavity 28, but resist deformation when an attempt is made to withdraw the attachment head 14 from cavity 28.

The simplest use of the connector 10 is the edge-to-edge assembly of two or more panels 20 into a single contiguous display. The form of connector 10 shown in FIG. 2A is used for this kind of construction. Such a multipanel display may be chosen to reside substantially in the same plane, or may be hinged such that the panels are at angles to each other. One important technical advantage of the present invention is that in use, the form of connector 10 shown in FIG. 2A is invisible to an observer of the display, providing a neater and less cluttered appearance.

Figure 7A:
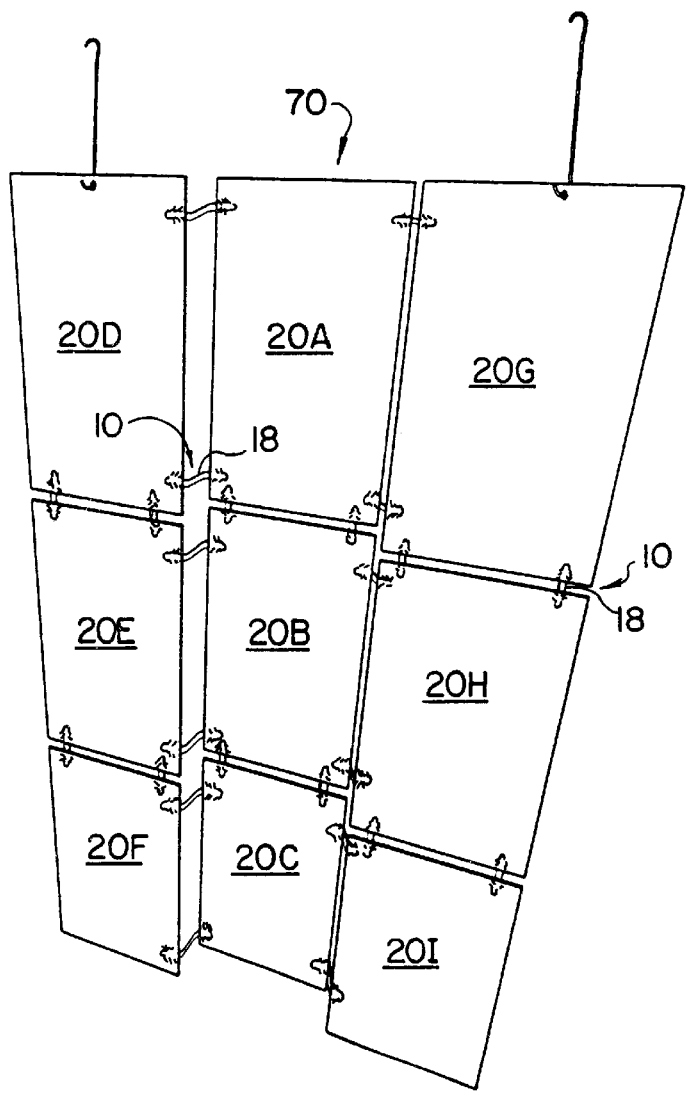
FIGS. 7A and 7B show a first configuration of a display constructed using a connector having a spacer portion according to the present invention.
Figure 7B:
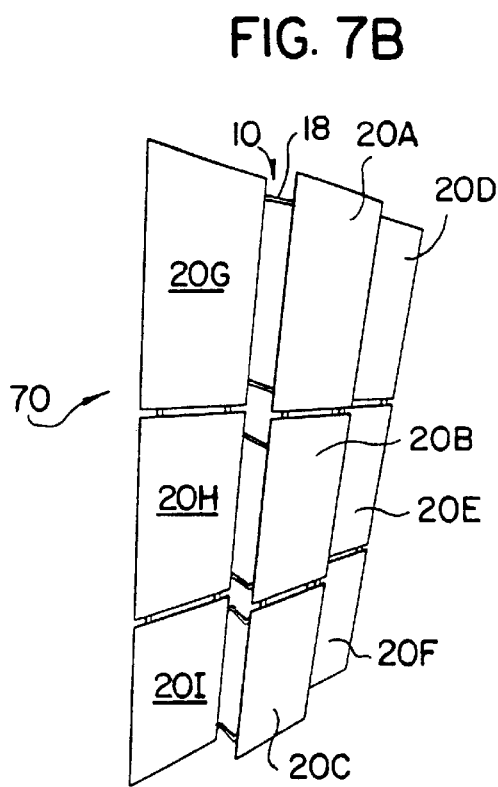

The connector 10 of the present invention facilitates the construction of several other novel displays, which for example may be point of purchase displays. By way of illustration, FIGS. 7A and 7B show a display 70 constructed using the connector 10 having a spacer portion 18 (FIGS. 1D and 1E). The display 70 is composed of plural foam core panels 20 which are connected in vertically in columns, which vertical columns are connected horizontally to adjacent columns. For example, panels 20A–20C, panels 20D–20F and panels 20H–20J, respectively, are connected in a vertically spaced relationship using a connector 10 having a spacer portion 18 such depicted in FIG. 1D. The spacer portion 18 ensures that the panels 20A–20C and 20D–20F are uniformly spaced a predetermined distance from one another.

More particularly, the panels 20 are connected using the above described method in which a cavity 28 is formed in the foam core 22 using a cavity-forming heating tool, resulting in the formation of a cavity skin 30 which aids in retaining the barbs 16.

The column of panels 20A–20C is horizontally connected to the column of panels 20D–F and 20H–J using a connector 10 having a spacer portion 18 such as depicted in FIG. 1E. Importantly, the spacer portion 18 (FIG. 1E) is stepped such that attachment head 14A is in a different plane from attachment head 14B. Consequently, the connector 10 shown in FIG. 1E will position the column of panels 20A–20C in a fixed, spaced relationship in a different plane from the columns of panels 20D–F and 20H–J.

Figure 8A:
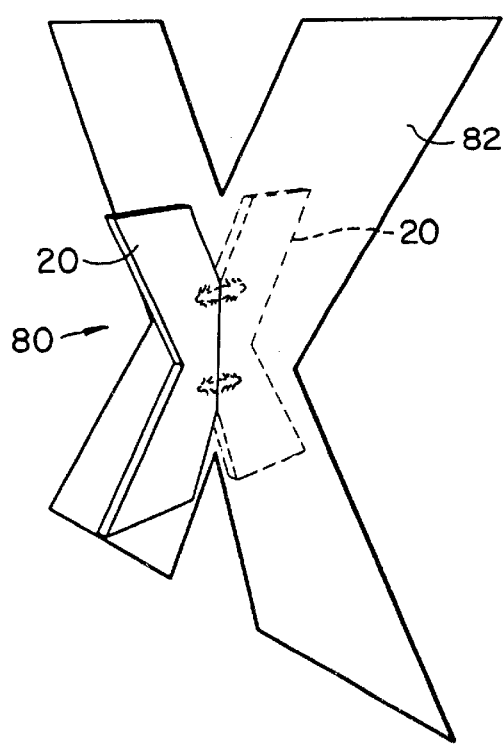
FIGS. 8A and 8B show a second configuration of a display constructed using a connector according to the present invention.
Figure 8B:
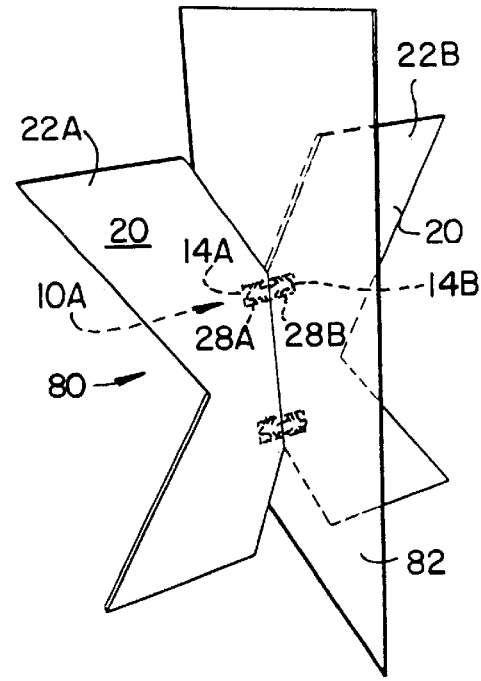

FIGS. 8A and 8B illustrate a second point of purchase display 80 which may be constructed using the connector 10 of the present invention. The display 80 includes a panel 82 and two foam core panels (leg members) 20. For visual design reasons, the panel 82 may be formed of transparent plastic; however, the panel 82 may be formed of practically any material, and need not be formed of foam core, and may as easily be translucent or opaque. While the constructions illustrated herein are built around thin intervening panels, the present invention can also be used with central or intermediate through-connected members having greater thicknesses.

As best see in FIG. 8B, one or more holes 86 are defined in panel 82 to facilitate connector 10 to interconnect panels 20. The attachment head 14A of connector 10A is inserted through the hole 86 into the cavity 28A formed in a side edge portion of the foam core 22A, and attachment head 14B is inserted through the hole 86 into the cavity 28B formed in a side edge portion of the foam core 22B. It should be noted that the panels 20 provide additional support or rigidity for the panel 82.

The panels 20 are connected using the above described method in which a cavity 28 is formed in the foam core 22 using a cavity-forming heating tool, resulting in the formation of a cavity skin 30 which aids in retaining the barbs 16.

FIGS. 9A and 9B illustrate yet another point of purchase display 90 which may be constructed using the connector 10 of the present invention. The display 90 includes a support member 92 and two or more foam core panels 20. For aesthetic reasons, the support member 92 is preferably formed of transparent plastic; however, the support member 92 may be formed of practically any material and need not be formed of foam core. As shown in FIG. 9A the support member 92 does not have to be planar (flat). In particular, the support member 92 may be curved in any number of shapes. The foam core panels 20 are contoured to match the surface profile of the support member 92, and provide additional support or rigidity to the support member 92. The panels 20 may be used as shelves to support samples of goods for sale.

As best seen in FIG. 9B, one or more holes 96 are defined in the support member 92 to facilitate connector 10 to interconnect corresponding panels 20. The attachment head 14A of connector 10A is inserted through the hole 96 into the cavity 28A formed in a side edge portion of the foam core 22A, and attachment head 14B is inserted through the hole 96 into the cavity 28B formed in a side edge portion of the foam core 22B.

The panels 20 are connected using the above described method in which a cavity 28 is formed in the foam core 22 using a cavity-forming heating tool, resulting in the formation of a skin 30 which aids in retaining the barbs 16.

Figure 10:
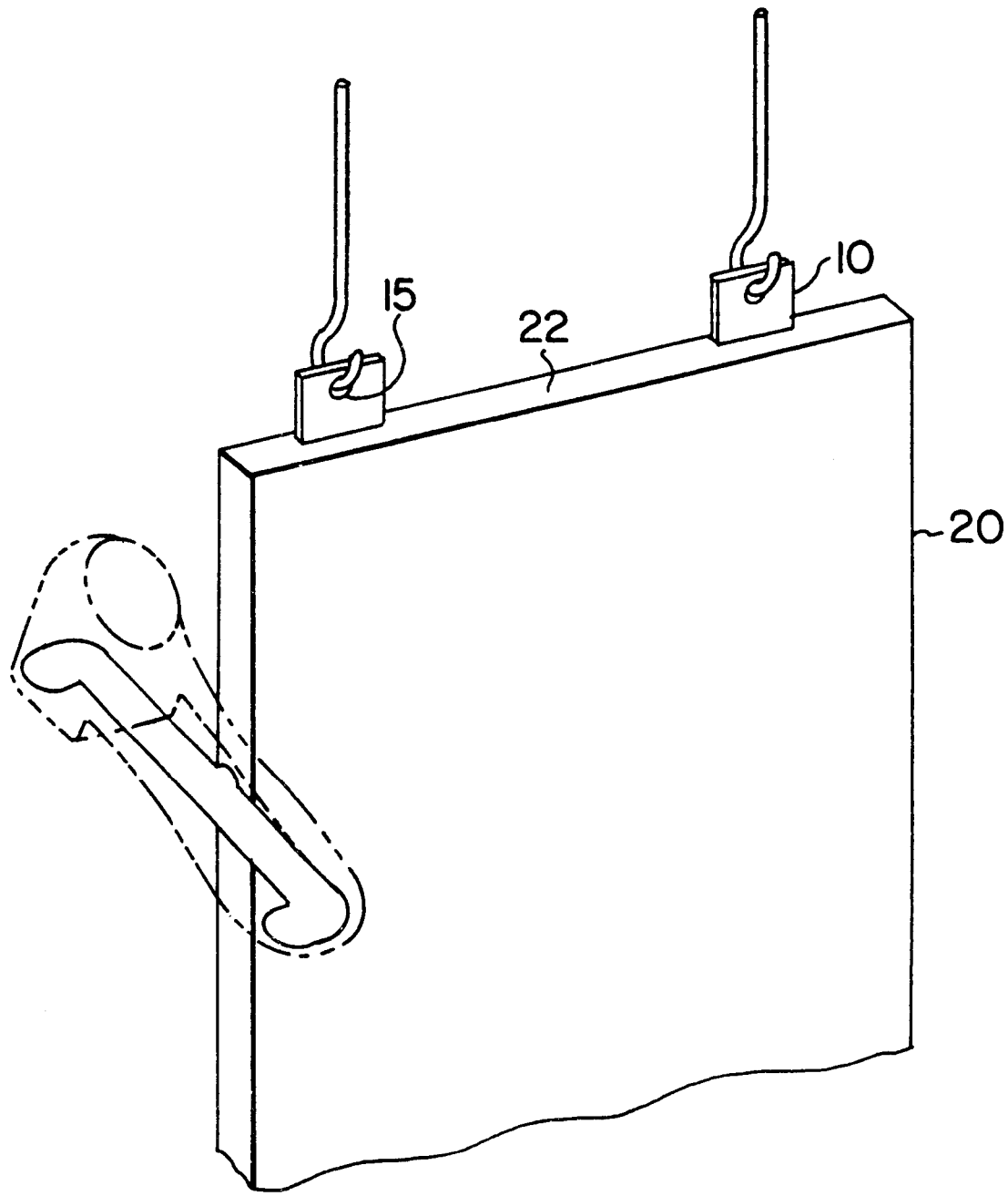
FIG. 10 shows a fourth configuration of a display constructed using a connector according to the present invention.

FIG. 10 illustrates yet another point of purchase display 1000 which may be constructed using the connector 10 of the present invention. The display 1000 includes a foam core panel 20 and at least one connector 10A. The connector 10 of the type shown in FIG. 1J or FIG. 1K is inserted in an edge portion, with the mounting hole 15 exposed. The mounting hole 15 enables the display 1000 to be removably attached to a hook, or a vertical support such as a wire or the like.

More particularly, the display 1000 may be constructed as any of the displays 70, 80, or 90 shown in FIGS. 7A–9B, and further including the connector 10 of the type shown in FIG. 1J or FIG. 1K.

Still further any of the displays 70, 80, 90 or 1000 may further be provided with a connector 10 of the type shown in FIG. 1L having a support portion 17. In this manner, a display capable of supporting display items may be constructed.

While the preferred embodiments of the invention have been shown and described, it will be apparent to those skilled in the art that changes and modifications may be made therein without departing from the spirit of the invention, the scope of which is defined by the appended claims.

What is claimed is:

1. A connector used to join two or more panels having a foam core and having a cavity bounded by a densified skin and defined in an edge thereof, the connector comprising:
    a connector body having a length;
    at least two attachment heads provided on said connector body, said attachment heads being dimensioned to fit snugly within the corresponding cavities defined in the foam core;
    elongated plural barbs provided on each said attachment head, said barbs being configured to pierce the internal sidewalls bounding the cavity and inhibit withdrawal of the attachment head from the cavity defined in the foam core, said barbs elastically deforming toward said connector body when said attachment bead is inserted into the foam core of the panel and subsequently resisting deformation to inhibit withdrawal of the barbs from the foam core, the barbs being more yielding to forces at a substantial angle to the connector body than to extraction forces in substantial alignment with the length.

2. The connector according to claim 1, wherein said attachment heads, said connector body, and said plural barbs are integrally formed as a single piece.

3. The connector according to claim 1, wherein said connector body is formed of a material selected from the group comprising plastics and metal.

4. The connector according to claim 1, wherein said attachment head has a thickness $T_{head}$ and the foam core has a thickness $T_{foam}$, and the ratio of $T_{head}$ to $T_{foam}$, is generally 1:3.

5. The connector according to claim 1, comprising two attachment heads on a first side of said body and two attachment heads on an opposite side of said body.

6. The connector according to claim 1, wherein said connector body is a generally circular disk and includes plural radial attachment heads.

7. The connector according to claim 1, wherein the connector body includes a spacer portion which inhibits insertion of the connector body into the cavity such that the spacer portion provides predetermined spacing between adjacent panels.

8. The connector according to claim 7, wherein said spacer portion has a width $W_{spacer}$ which is greater than a combined width $W_{combined}$ of the attachment head and the barbs.

9. A connector used to mount a panel having a foam core having a cavity bounded by a densified skin and defined in an edge thereof, comprising:
    a connector body having a length;
    at least one attachment head provided on said connector body, said attachment head being dimensioned to fit snugly within the corresponding cavities defined in the foam core;
    elongated plural barbs provided on said attachment head, said barbs being configured to pierce the internal sidewalls bounding the cavity and inhibit withdrawal of the attachment head from the cavity defined in the foam core, said barbs elastically deforming toward said connector body when said attachment head is inserted into the foam core of the panel and subsequently resisting deformation to inhibit withdrawal of the barbs from the foam core, the barbs being more yielding to forces at a substantial angle to the connector body than to extraction forces in substantial alignment with the length; and
    an attachment portion provided on said body, said attachment portion defining an aperture.

10. The connector according to claim 9, wherein said attachment head, said connector body, and said plural barbs are integrally formed as a single piece.

11. The connector according to claim 9, wherein said connector body is formed of a material selected from the group comprising plastics and metal.

12. A method for connecting two panels having a foam core, comprising:
    providing at least two foam core panels each having a length, a width perpendicular to the length, and a thickness perpendicular to the length and the width, the thickness being much smaller than the length or the width;
    for each panel, forming a cavity in an edge thereof, each cavity having a length l in a plane of the length and width of the panel, and a thickness t parallel to the thickness of the panel, each cavity being bounded by a skin;
    providing a connector having a connector body, at least first and second attachment heads provided on said connector body and plural barbs provided on each said attachment head, said barbs elastically defoaming toward the connector body when the attachment head is inserted into the foam core panel and resisting deformation to inhibit withdrawal of the barbs from the foam core panel; and
    forcefully inserting said first and second attachment heads into corresponding cavities such that said barbs pierce the skin of the respective cavity and inhibit withdrawal of the attachment head from the panel.

13. The method according to claim 12, wherein said step of forming the cavity comprises using a heating tool which selectively causes the foam to thermoplastically collapse to form the skin of the cavity.

14. The method according to claim 12 wherein the foam core has a density $D_{foam}$ and the internal sidewall has a density $D_{skin}$ wherein $D_{foam} < D_{skin}$.

15. The method according to claim 12 wherein the density $D_{foam}$ falls in the range of 0.02 grams per cubic centimeter to 0.15 grams per cubic centimeter and the density $D_{skin}$ falls in the range of 0.9 grams per cubic centimeter to 1.25 grams per cubic centimeter.

16. A point of purchase display, comprising:
    a member having at least one hole defined therethrough;
    at least two foam core panels, each said panel having a foam core having a cavity bounded by a skin and formed in an edge portion thereof,
    a connector having a body portion;
    at least two attachment heads provided on said body portion, said attachment heads being dimensioned to fit snugly within corresponding ones of said cavities defined in said foam core panels;
    plural barbs provided on each said attachment head, said barbs being configured to pierce said skin and inhibit withdrawal of said attachment head from said cavity;
    said connector being inserted into said at least one hole and connecting said at least two foam core panels on opposite sides of said member.

17. The point of purchase display according to claim 16, wherein said foam core panels form shelves on either side of said member.

18. The point of purchase display according to claim 16, wherein said member is formed of a flat transparent material.

19. The point of purchase display according to claim 16, wherein edges of said foam core panels are curved and said member is and contoured to the curved edges of said foam core panels.

20. The point of purchase display according to claim 16, wherein said foam core has a density $D_{foam}$ and said internal sidewalls have a density $D_{skin}$ wherein $D_{foam} < D_{skin}$.

21. The point of purchase display according to claim 16, wherein said at least two panels are connected to one another using said connector to form a substantially continuous planar surface, with said connector being substantially contained within said cavity such that said connector is not generally externally visible.

22. The point of purchase display according to claim 16, further comprising:
    at least one mounting member used to mount the point of sale display; and
    for each said at least one mounting members providing a mounting cavity in one of said at least two foam core panels, said mounting cavity being bounded by a skin and formed in an edge portion of said foam core panels;
    said mounting member having:
        a body portion;
        at least one mounting head provided on said body portion, said mounting head being dimensioned to fit snugly within one of said cavities defined in said foam core panels;
        plural barbs provided on said mounting bead, said barbs being configured to pierce said skin and inhibit withdrawal of said mounting head from said cavity;
        a mounting portion provided on said body portion, said mounting portion defining an aperture used to mount the display; and
        said mounting head being inserted into one of said cavities.

23. A point of purchase display, comprising:
    a plurality of panels, each said panel having a foam core having a first cavity defined in a vertical edge portion thereof and a second cavity defined in a horizontal side edge portion thereof, each said cavity being bounded by internal sidewalls;
    a plurality of connectors, each said connector having a body portion;
    at least two attachment heads provided on each said body portion, said attachment heads being dimensioned to fit snugly within corresponding said cavities defined in said foam core panels;
    plural barbs provided on each said attachment head, said barbs being configured to pierce said internal sidewalls and inhibit withdrawal of said attachment head from said cavity; and
    said plurality of panels being connected in a series of rows and columns with selected ones of said plurality of connectors connecting adjacent ones of said plurality of panels.

24. The point of purchase display according to claim 23, wherein said foam core has a density $D_{foam}$ and a peripheral portion of said foam core bounding said cavity has a density $D_{skin}$ wherein $D_{foam} < D_{skin}$.

25. The point of purchase display according to claim 23, comprising:
    a first column of panels in a first plane; and
    a second column of panels in a second plane which is different from said first plane, said first column of panels being connected to said second column of panels by said connectors.

26. The point of purchase display according to claim 23, wherein said plurality of panels are connected to one another using said connectors to form a substantially continuous planar surface, with said connectors being substantially contained within corresponding cavities such that said connectors are not generally externally visible.

27. The point of purchase display according to claim 23, further comprising:
   at least one mounting member used to mount the point of sale display; and
   for each said at least one mounting member, providing a mounting cavity in one of said at least two foam core panels, said mounting cavity being bounded by a skin and formed in an edge portion of said foam core panels;
   said mounting member having:
      a body portion;
      at least one mounting head provided on said body portion, said mounting head being dimensioned to fit snugly within one of said cavities defined in said foam core panels;
      plural bats provided on said mounting head, said barbs being configured to pierce said skin and inhibit withdrawal of said mounting head from said cavity;
      a mounting portion provided on said body portion, said mounting portion defining an aperture used to mount the display; and
      said mounting head being inserted into one of said cavities.

28. A display comprising:
   a plurality of panels including first and second foam core panels, each panel having a front sheet, a rear sheet and a foam core in between the front and rear sheets made of a foam of thermoplastic material, each of the first and second panels having at least a first edge;
   on each first edge, at least one cavity Conned to extend inwardly from the first edge into the foam core, the cavity being bounded by a skin of collapsed foam; and
   at least one connector having at least first and second attachment beads, each attachment head having a plurality of barbs, one attachment head of said at least one connector inserted into the cavity formed the first panel, another attachment head of said least one connector inserted into the cavity formed in the second panel, wherein said barbs elastically deforming toward said connector when said attachment head is inserted into the foam core of the panel and subsequently resisting deformation to inhibit withdrawal of the barbs from the foam core, whereby an edge-to-edge junction of the first and second panels is effected.

29. The display according to claim 28, further comprising:
   at least one mounting member used to mount the point of sale display; and
   for each said at least one mounting member, providing a mounting cavity in one of said at least two foam core panels, said mounting cavity being bounded by a skin and formed in an edge portion of said foam core panels;
   said mounting member having:
      a body portion;
      at least one mounting head provided on said body portion, said mounting head being dimensioned to fit snugly within one of said cavities defined in said foam core panels;
      plural barbs provided on said mounting head, said barbs being configured to pierce said skin and inhibit withdrawal of said mounting head from said cavity;
      a mounting portion provided on said body portion, said mounting portion defining an aperture used to mount the display; and
      said mounting head being inserted into one of said cavities.

30. A connector used with a panel having a foam core and having a cavity bounded by a densified skin and defined in an edge thereof, the connector comprising:
   a connector body having a length;
   an attachment head provided on said connector body, said attachment head being dimensioned to fit snugly within the corresponding cavities defined in the foam core;
   elongated plural barbs provided on each said attachment head, said barbs being configured to pierce the internal sidewalls bounding the cavity and inhibit withdrawal of the attachment head from the cavity defined in the foam core, said barbs elastically deforming toward said connector body when said attachment head is inserted into the foam core of the panel and subsequently resisting deformation to inhibit withdrawal of the barbs from the foam core, the barbs being more yielding to forces at a substantial angle to the connector body than to extraction forces in substantial alignment with the length.

* * * * *